United States Patent
Lu et al.

(10) Patent No.: US 11,792,718 B2
(45) Date of Patent: Oct. 17, 2023

(54) AUTHENTICATION CHAINING IN MICRO BRANCH DEPLOYMENT

(71) Applicant: HEWLETT PACKARD ENTERPRISE DEVELOPMENT LP, Houston, TX (US)

(72) Inventors: Hao Lu, Santa Clara, CA (US); Xiaoding Shang, Beijing (CN); Feng Ding, Beijing (CN); Qiwei Chang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 273 days.

(21) Appl. No.: 17/182,058

(22) Filed: Feb. 22, 2021

(65) Prior Publication Data

US 2022/0272614 A1     Aug. 25, 2022

(51) Int. Cl.
*H04W 48/12* (2009.01)
*H04W 48/16* (2009.01)
*H04W 12/06* (2021.01)
*H04W 88/08* (2009.01)
*H04W 88/16* (2009.01)

(52) U.S. Cl.
CPC .......... *H04W 48/12* (2013.01); *H04W 12/06* (2013.01); *H04W 48/16* (2013.01); *H04W 88/08* (2013.01); *H04W 88/16* (2013.01)

(58) Field of Classification Search
CPC ..... H04W 48/12; H04W 12/06; H04W 48/16; H04W 88/08; H04W 88/16; H04W 84/12; H04W 84/18; H04W 12/088; H04L 41/12; H04L 63/0209; H04L 63/08
See application file for complete search history.

(56) References Cited

U.S. PATENT DOCUMENTS

| | | | |
|---|---|---|---|
| 7,539,481 B2 | 5/2009 | Abhishek et al. | |
| 8,102,814 B2 | 1/2012 | Rahman et al. | |
| 10,924,343 B1* | 2/2021 | Shukla | H04L 67/104 |
| 2012/0158979 A1* | 6/2012 | Lee | H04W 48/20 |
| | | | 709/229 |
| 2015/0373639 A1 | 12/2015 | Zhou et al. | |
| 2018/0213580 A1 | 7/2018 | Taskin et al. | |
| 2018/0310301 A1* | 10/2018 | Amini | H04L 27/34 |
| 2019/0253409 A1* | 8/2019 | Spencer | H04W 12/73 |
| 2019/0332824 A1* | 10/2019 | Patwardhan | H04W 4/024 |
| 2021/0306338 A1* | 9/2021 | Miriyala | G06F 9/468 |

OTHER PUBLICATIONS

Jujjavarapu, L., "Detection of Inconsistencies in Firewalls," California State University, Sacramento, 2014, 262 pgs., http://dspace.calstate.edu/bitstream/handle/10211.3/121979/Lavanya_Jujjavarapu_Project_Report_Final.pdf?sequence=1.

* cited by examiner

*Primary Examiner* — Abdullahi Ahmed
(74) *Attorney, Agent, or Firm* — Sheppard Mullin Richter & Hampton LLP

(57) ABSTRACT

Systems and methods are provided for authentication chaining and firewall optimization in a micro branch deployment comprising a plurality of chained access points (APs) and a gateway AP. A topology of the micro branch deployment may be determined through enhanced hierarchical beaconing. Based on the determined topology, an authentication chain is developed through which a client device associated to an AP of the plurality of chained APs may be authenticated and granted access to the AP. Upon authentication of the client device, firewall optimization is performed to implement access control rules only at the AP to which the client device is associated.

18 Claims, 9 Drawing Sheets

AUTHENTICATION CHAINING IN MICRO BRANCH DEPLOYMENT

BACKGROUND

Software defined wide area networks (SDWANs) are network topologies that interconnect sites of a wide area network (WAN) using the principles of software defined networking (SDN), such as the separation of the control layer of traffic management from the data forwarding layer. SDWANs support infrastructure consolidation through network function virtualization (NFV). NFV reduces the administrative overhead and hardware cost of adding network functions to a WAN by virtualizing the network functions using virtual machines on more common and cheaper "commodity" hardware.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
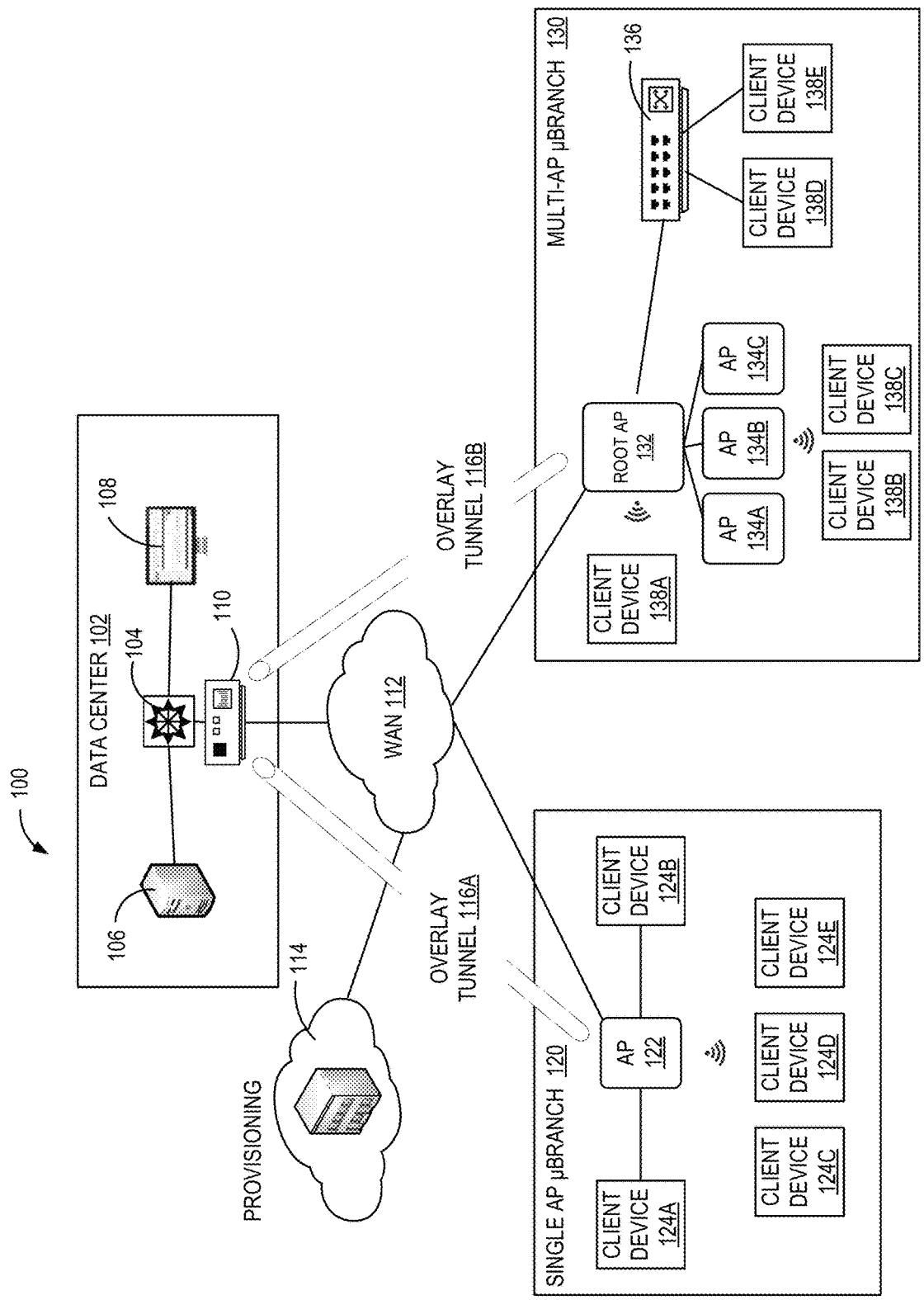
FIG. 1 illustrates an example network including micro branch deployments in which embodiments of the technology disclosed herein may be applied.

The figures are not exhaustive and do not limit the present disclosure to the precise form disclosed.

DETAILED DESCRIPTION

Various embodiments are directed to systems and methods of authentication chaining in a micro branch deployment that can address the issue of multiple firewalls in a daisy chaining network topology, e.g., where APs may be daisy chained/connected in series. First, an instant access point (IAP) (e.g., controller-less AP) hierarchical beacon mechanism can be enhanced to discover the branch parent-child network topology tree of a micro branch deployment. Second, information regarding this topology can be used to build an authentication proxy chain. When a client device connects to a micro branch deployment network, this authentication proxy chain can be automatically triggered from a leaf AP to a gateway AP (GAP). Third, and as a result of this proxy chaining process, each AP in a micro branch deployment can provision client device entry and firewall policy properly while avoiding duplicate authentication transactions and optimizing overall traffic flow processing times.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

A software defined wide area network (SDWAN) allows a network administrator to connect branch locations to a core site over a wide area network (WAN). The use of software defined networking (SDN) decouples network traffic decisions from the various devices within the network, such as routers, switches, bridges, and other common network devices. This decoupling essentially turns each networking device into a simple packet forwarding device. The SDWAN sets the potential traffic paths through each network device based on client policies (e.g., QoS requirements, bandwidth, etc.) to connect the branch locations within the SDWAN to the core site or data center, which is provided to each network device over a control channel. Instead of making a decision on how to route traffic when data is received, the network devices simply execute the route identified by the SDWAN administrator.

As alluded to above, the use of a SDWAN facilitates virtualization of network services across the WAN. Network function virtualization (NFV) reduces the administrative overhead and hardware cost of adding network functions to a WAN by virtualizing the network functions using virtual machines on more common and cheaper "commodity" hardware, rather than proprietary, dedicated hardware (as traditionally required). For example, functions like routing, load balancing, and firewalls may be operated as virtual machines (VMs) hosted at a data center and/or in the cloud. However, NFV focuses on virtualizing functions, but does not concern itself with how data packets are routed to the virtual machines running the network functions. SDWAN combined with NFV provides a more fully realized virtual network, where the SDWAN provides the routing policies for traffic flows from branch locations to the core site or data center hosting the NFV virtual machines. Branch users are capable of utilizing these resources through the SDWAN, reducing reliance on expensive proprietary hardware and reducing the amount of computing hardware required at branch sites of the WAN.

SDWANs may be implemented by creating a virtual overlay that is transport-agnostic and abstracts underlying private or public network connections. These network connections may include Multiprotocol Label Switching (MPLS), internet broadband, fiber, wireless or Long Term Evolution (LTE), to name a few. In some examples, virtual private network (VPN) tunnels are created between WAN sites to allow for private, secure interconnection across potentially vulnerable and insecure public links (e.g. Internet links). Clients may maintain existing WAN links and implement an overlay SDWAN using these tunnels to optimize bandwidth by directing WAN traffic to and from other WAN sites using identified routes that include these tunnels. Accordingly, SDWANs may be used to centralize network control across the entire WAN. Remote users, such as branch users, are capable of utilizing resources hosted at a data center and/or the cloud to run applications within the network.

As a practical example, a traditional branch deployment supports client connectivity requirements across different geographical locations for various types of business operations. The sites in remote geographical locations serve as branch offices, while the headquarters or main office serves as a data center that hosts network resources to store, manage, and distribute data. The main office also hosts a centralized Virtual Private Network (VPN) management system to aggregate traffic from the remote branch sites. An SDWAN facilitates connecting multiple local area networks to a central corporate network or data centers separated by distance.

For micro branch deployments, there is no need for a dedicated gateway device. Instead, a single gateway AP (GAP) can be used as a WAN-facing gateway. Additional APs may be added "under" the GAP to extend wireless coverage in the micro branch deployment. APs can refer to a network device that allows a wireless-compliant device, such as a client device, station (STA), etc. to connect to a wired network. Thus, an AP essentially functions as an extension mechanism from an existing wired network to a community of wireless client devices. It should be understood that gateways typically refer to APs that have network address translation (NAT) routing and dynamic host control protocol (DHCP) server capabilities In micro branch deployments, the GAP "owns" the public IP address, provides gateway/gateway-similar functionality (e.g., DHCP, NAT, routing, etc. capabilities), and may further host a VPN client for providing secure connectivity to a remote (e.g., main office) data center or other cloud service(s) based on the needs of the micro branch. Configuration between the GAP of a micro branch deployment and any additional APs are typically different because their respective roles in a micro branch deployment differ.

Before describing embodiments of the disclosed systems and methods in detail, it is useful to describe an example micro branch deployment network with which the systems and methods disclosed might be implemented in various applications. FIG. 1 illustrates one example of a network 100 that includes micro branch deployments. In this example, network 100 may comprise a data center 102 to which a single AP micro branch deployment 120 and a multi-AP micro branch deployment 130 are operatively connected. Also part of network 100 is a provisioning system, e.g., a cloud-based zero-touch provisioning system/service 114. As noted above, an SDWAN, such as WAN 112 allows the various elements/entities of network 100 to be interconnected. It should be noted that embodiments described herein may reference the use of a SDWAN or may describe features/functionalities in the context of a SDWAN. However, embodiments of the present disclosure are not limited to SDWANs, but contemplate use in traditional WANs/in the traditional WAN context.

As alluded to above, data center 102 may be representative of an enterprise main office. Data center 102 may include a controller or core switch 104 to which a DHCP server 106 and a policy management platform 108 are operatively connected. It should be understood that depending on how a connection between data center 102 and a remote branch (in this example, micro branches 120, 130) is implemented, the functionality of element 104 may differ, Some virtual LANs may be Layer 3-routed, in which case, a VPN concentrator may send traffic flows to a core switch, e.g., core switch 104 which can be high speed core switch. Core switch 104 may then route the packets of the flows to the requisite, subsequent hop. Alternatively, in the context of virtual LANs that are Layer 2-connected, the VPN concentrator may simply route GRE packets (described below) to a controller, which in this case, would be element 104 also functioning as a controller.

As would be understood by those skilled in the art, DHCP server 106 can refer to a network element that dynamically assigns an IP address and other network parameters to each device on the network. Policy management platform 108 may be implemented to safely/properly connect devices, such as client devices, to a network. For example, policy management platform 108 may provide new device onboarding, grant varying levels of access to the network, maintain network security, etc.

As further illustrated in FIG. 1, data center 102 is connected to micro branch 120 via an overlay tunnel 116A. As noted above, VPN tunnels can be established between sites, in this case, data center 102 and micro branch 120 to create an SDWAN overlay network. In particular, overlay tunnel 116A may connect AP 122 of micro branch 120 to a headend gateway 110, which may act as a VPN concentrator and overlay terminator (using, e.g., a generic routing encapsulation (GRE) tunneling protocol) for terminating VPN tunnels, in this instance, overlay tunnel 116A, thereby providing routing from micro branch 120 into data center 102. Similarly, micro branch 130 (which, in contrast to micro branch 120, is a multi-AP micro branch including root AP 132 and leaf APs 134A-134C) may be operatively connected to data center 102 via overlay tunnel 116B.

Micro branch 120 is a single AP micro branch, where one or more client devices, such as client devices 124A-E may associate to an AP, e.g., AP 122 (wirelessly or via wired connection), to allow connectivity to data center 102. Micro branch 130 is a multi-AP micro branch, where, in this example, multiple APs 134A-134C are operatively connected to root AP 132 through which connectivity to data center 102 may be effectuated. Micro branch 130 may include one or more client devices, e.g., client devices 138A-C, each of which may associate directly to root AP 132 or to one of APs 134A-134C. In this example, micro branch 130 may further include an unmanaged switch 136 to which additional client devices, e.g., client devices 138D-E connect.

Figure 2:
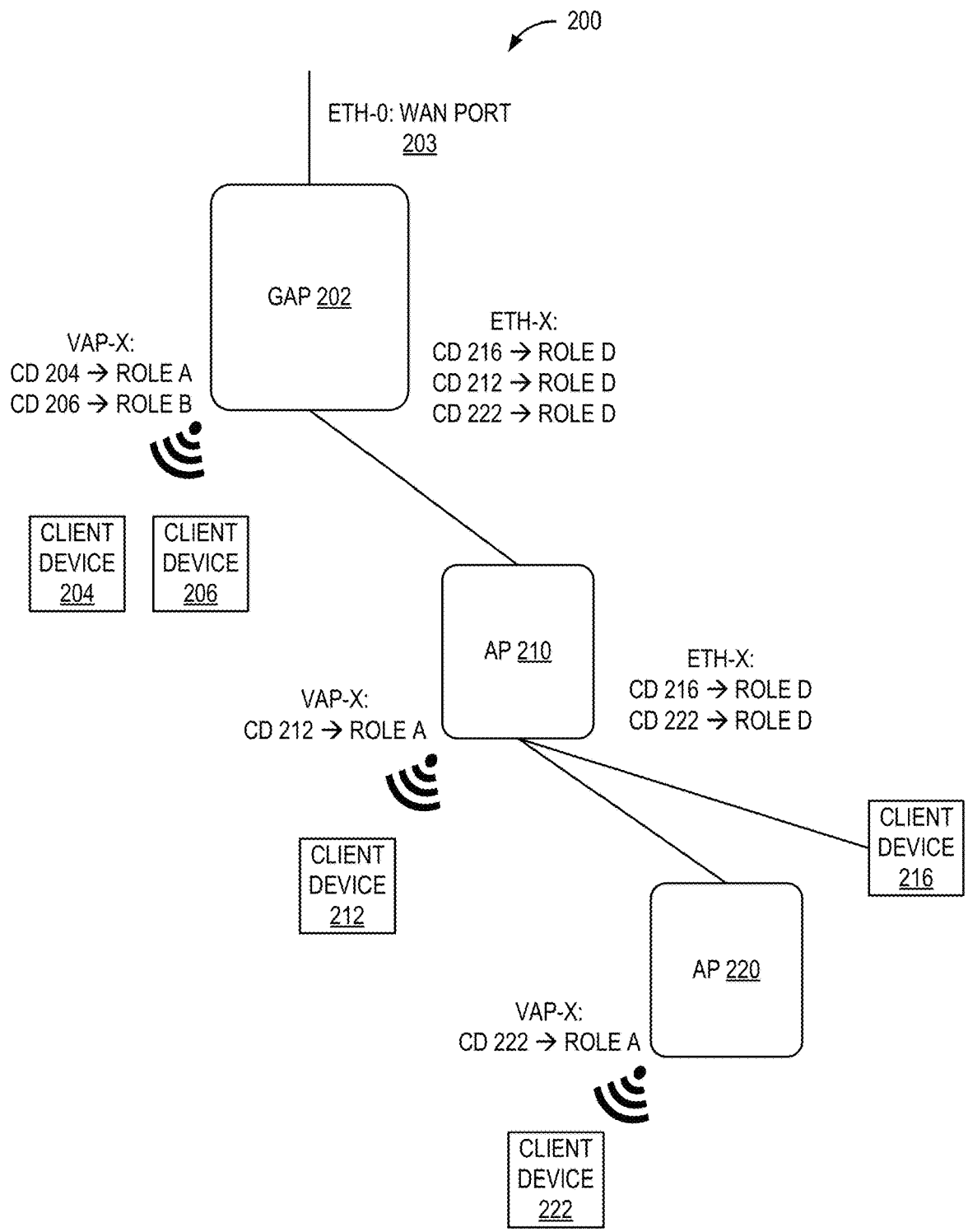
FIG. 2 illustrates an example of access point daisy chaining in a micro branch deployment.

Referring now to FIG. 2, another micro branch deployment 200 is illustrated, where micro branch deployment 200 has a daisy chain topology/hierarchy with respect to its APs. As noted above, in a micro branch deployment, such as micro branch deployment 200, there is no need for a dedicated gateway. Instead, a GAP, e.g., GAP 202 acts as a WAN-facing gateway, and in this example, may be connected over an Ethernet connection (Eth-0) via a WAN port 203 of GAP 202. A first AP, AP 210, may be operatively connected to GAP 202, and in turn, a second AP, AP 220, may be operatively connected to AP 210, i.e., APs 210 and 220 are daisy chained to GAP 202.

As illustrated in FIG. 2, two client devices 204 and 206, e.g., a laptop, a phone, a printer, or other computing device may be wirelessly associated to GAP 202. In this example, GAP 202 may be configured to operate as a plurality of virtual APs (VAPs). As would be understood by those skilled in the art, VAPs simulate multiple APs on a single physical AP. Each VAP may have its own unique service set ID (SSID) thereby segmenting a WLAN into multiple broadcast domains. Security can be customized/configured to control wireless client device access. In this example, when client device 204 connects to GAP 202, it may be designated a particular user role. It should be understood that every client device in network, e.g., network 100 (FIG. 1) to which micro branch deployment 200 may be operatively connected, is associated with a user role. That user role determines that client device's network privileges, frequency of re-authentication, applicable bandwidth contracts, and so on. In this example, client device 204 (from the perspective of GAP 202) is associated with a user role, role A. A second client device associated to GAP 202, i.e., client device 206, may have its own associated user role in the eyes of GAP 202, role B.

With respect to AP 210 of micro branch deployment 200, a client device 212, which again, can be a laptop, phone, other user/client device, etc. may be associated to a VAP (VAP-X) configured on AP 210. Client device 212 may be associated with a user role, role A, from the perspective of AP 210. However, given that AP 210 is connected to/"under" GAP 202, from GAP 202's perspective, client device 212 may be associated with a user role, role D. It should be understood that user roles can be assigned in a variety of ways based on network configuration. In some embodiments, an assigned user role can refer to a static role (combined with a port) such that all client devices that are connected to the same port/VAP may be assigned the same user role. Alternatively, user role derivation may be used, which can be based on client device attributes, such as MAC address, connected port, etc. Moreover, it should be understood that a user role can refer to a policy container, where typically, different policies may be configured for different roles, although it is possible to configure the same policy for different user roles. Typically, different user roles may be assigned to APs, wired client devices, and wireless client devices. Another client device 216 may be associated to AP 210, this time, over an Ethernet connection, and can be assigned a user role, role D. Yet another client device 222 may be associated to a VAP (VAP-X) of AP 220, and may be assigned its own user role, role A.

Given that AP 220 is daisy chained to GAP 202 through AP 210, AP 210 may also assign a user role to client device 222, in this example, role D (like client device 216). Moving up the chain to GAP 202, GAP 202 "sees" each client device associated to APs 210 and 220, and may thus assign each of those client devices, a particular user role, in this case, client device 216 (associated to AP 210), role D. GAP 202 may also assign client device 222 (associated to AP 220) a user role, i.e., role D. It can be appreciated that the privileges, e.g., firewall policy, may not necessarily be consistent across all the APs (GAP 202, AP 210, AP 220). It should also be appreciated that AP 220, AP 210, and GAP 220 are connected over a wired connection, e.g., Ethernet, and respective user roles assigned to those client devices that are associated with daisy chained APs, are served by an Eth-X server (which can serve both its own connected, wired client devices as well as any other wired/wireless clients served by a downlink AP. A VAP-X server typically only serves wireless client devices connected to a VAP port.

To address this firewall inconsistency conventionally, a network administrator can remove port access control list (ACL) policies for the wired (Eth-X) ports. For example, a network administrator can configure all wired ports to operate in a TRUST mode, or configure a "permit-all" port ACL in order to allow the firewall process for those wired ports. However, although firewall inconsistencies are addressed, configuring wired ports in this way can result in a potential security risk for the network. For example, an attacker may connect a client device, such as a laptop, to one of a daisy chained APs' wired ports. Because the wired port is operating in TRUST mode, or allows the firewall process to be bypassed without performing authentication of the client device, that attacker will be able to access the micro branch deployment network 200. This in turn allows the attacker full network access up to a main office network (e.g., data center 110 of FIG. 1), as well as other branch networks, e.g., micro branch networks 120, 130 (FIG. 1).

Another conventional mechanism for avoiding firewall inconsistencies is to chain authentication and use role derivation, using for example, Radius authentication. For example, when client device 222 connects to an AP, e.g., AP 220, Radius authentication can be triggered immediately on the connected wireless SSID (VAP-X), and a user role, e.g., role A, can be derived. When client device 222's packet(s) reach an "up-layer" AP, here AP 210, Radius authentication could again be triggered for the same client device, client device 222, on AP 210's wired port (Eth-X). Accordingly, the same user role could be derived and applied to AP 210's wired port. When a packet of client device 222 reaches GAP 202, the same authentication and user role derivation can occur. Although firewall processing remains consistent across the APs (and GAP), redundant authentication transactions are introduced, and extra flow processing time is incurred.

In a typical SDWAN/WAN branch deployment, a dedicated gateway device stands as a WAN-facing gateway. Enabling an authentication proxy, such as a Radius proxy on such a gateway device can involve, as part of user configuration, each SSID/Port being mapped to the gateway device. Thus, an AP is aware that the gateway is an authentication proxy device. When a client device connects to an AP, that AP sends an authentication request to the gateway device, which in turn effectuates authentication to a backend authentication server via the authentication proxy. When an authentication response comes back from the authentication server, both the gateway device and the AP are able to ascertain the assigned user role due from the authentication proxy.

However, even in this scenario, issues can arise. For the overlay case, those client devices will fall into an overlay-vlan-list, the gateway device will setup datapath user entries, and will apply the derived user role to the gateway datapath. It should be understood that overlay in this context can refer to use of a tunnel, e.g., GRE tunnel to send client device traffic between an AP and the gateway device. However, the same user role is not used by the AP (again resulting in firewall inconsistencies). Accordingly, an administrator would need to configure a separate user role for the AP's SSID/wired port profile, which would be distinct from the authentication and user role derivation process. While such an approach addresses the issue of redundant/duplicated authentication transactions, it nevertheless introduces extra management effort, not to mention the administrator must be very clear on those policies that need to be configured and executed by the gateway device and AP.

For the underlay case, those clients won't fall into an overlay-vlan-list, the gateway does not setup a datapath user entry, and no user role will be applied to the gateway datapath. Underlay in this context can refer to traffic being directly bridged (no GRE tunnel) in a micro branch deployment, and as such, all APs in a micro branch deployment will see the same client devices in the micro branch deployment, i.e., there is no overlay within the micro branch. Instead, the user entry will be in the AP datapath, and the derived user role will be applied by the AP. While this is sufficient when APs are just one hop away from the gateway, in the case of chained APs through APs' wired ports, a failure to apply an ACL policy on those wired ports will again result in a security risk. If authentication and user role derivation are configured for each wired port, the duplicate authentication transactions and extra flow processing time again become an issue across the daisy chained APs. As previously discussed, unlike a typical branch deployment, in a micro branch deployment, there is no dedicated gateway, only a GAP.

As noted above, various embodiments are directed to, ultimately, applying ACL rules only to the AP to which a client device is directly connected/associated. Other APs in a chaining path to the GAP of a micro branch deployment need not apply any rules to avoid redundant authentication and user rule derivation processes. These other APs need only be aware that a particular client device is associated/connected to a leaf AP, such that upon receiving traffic/packets from the client device, conventional processing/operations regarding authentication/user rule derivation can be ignored or otherwise bypassed. It should be noted that various embodiments are not dependent upon a cloud service/cloud-based functionality. A first step to achieving this independence involves discovering the branch parent-child topology of a micro branch deployment.

When an AP is configured in accordance with an "AP config service" operation, a unique "branch-key" will also be pushed from the cloud to all APs within the branch. In the case of a micro branch, a "micro-branch-gateway-AP" flag will be pushed from cloud AP config service to the GAP of the micro branch deployment, e.g., GAP 202 (FIG. 2). This micro-branch-gateway-AP flag will be saved in a memory unit, e.g., flash memory of the GAP. In accordance with one embodiment, this micro-branch-gateway-AP (or simply, GAP) flag can be leveraged to indicate this particular GAP is the "IAP master" for the micro branch. After the GAP is set as "IAP master", the conventional IAP hierarchical discovery process can commence.

That is, the GAP may periodically announces its appearance via a hierarchical beacon that is periodically broadcast (e.g., every second) through all its wired ports. This hierarchical beacon can be a Layer 2 (L2) broadcast data packet akin to a bridge protocol data unit (BPDU), i.e., a message transmitted by bridges to each other to facilitate determination of a spanning tree topology. Within the message, a field referred to as "ROOT IP" includes the GAP's management IP address.

Figure 3:
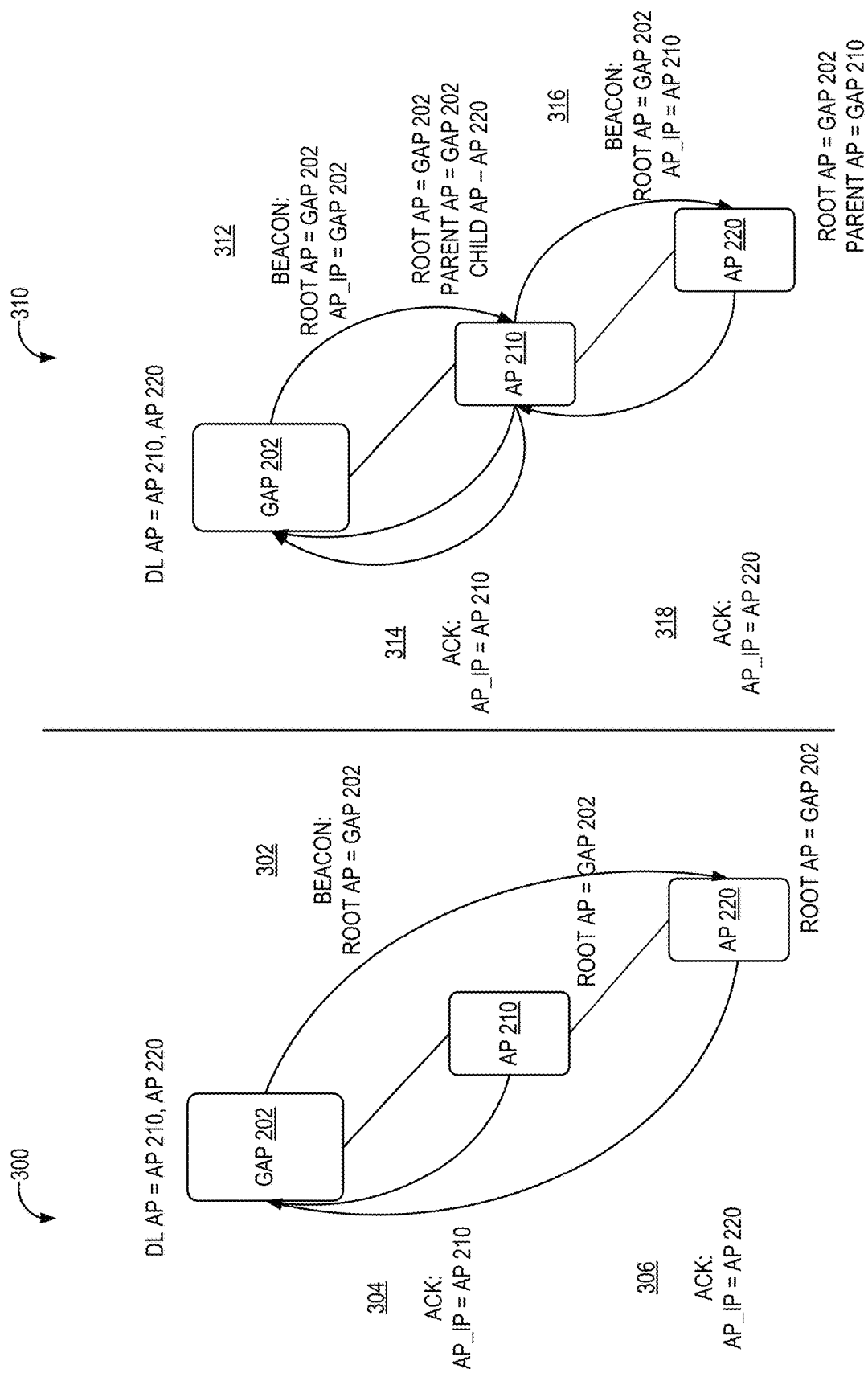
FIG. 3 illustrates an example of micro branch deployment topology discovery in accordance with one embodiment as compared to conventional topology discovery.

Referring to FIG. 3, and in accordance with conventional hierarchical beaconing process 300 when a downlink AP, e.g., AP 210 receives a hierarchical beacon message from GAP 202 at operation 302, the AP, e.g., AP 210 becomes aware that a root AP with the GAP's IP address exists in the network. In other words, AP 210 becomes aware of the existence of GAP 202. The downlink AP, in this example, AP 210 may then send a hierarchical acknowledgement (ACK) to the root AP at operation 304, in this example, GAP 202, where this ACK contains a field referred to as "AP_IP." That is, AP 210 sets the AP_IP address to its IP address. In this way, the root AP, i.e., GAP 202, will learn the downlink AP's IP address, i.e., the IP address of AP 210. If any downlink APs die or reboot for some reason, such downlink APs will not be able to transmit a hierarchical ACK back to the GAP. Thus, the GAP can remove that AP from its AP database, leaving only those downlink APs active within the micro branch deployment.

Similarly, upon receipt by AP 220 of the hierarchical beacon from the root AP, i.e., GAP 202 at operation 302, it too may respond to the hierarchical beacon by transmitting a hierarchical ACK back to GAP 202 including its IP address within the AP_IP field of the hierarchical ACK at operation 306. Accordingly, the GAP of a micro branch deployment is able to learn about all the APs in the micro branch deployment network. Likewise, the child APs in a micro branch deployment are able to learn about its root AP/GAP. For example, in an branch image upgrade scenario, since a root AP is aware of the IP addresses of its downlink APs, the root AP can gather more information about the downlink APs, e.g., AP type information. The root AP may then choose to directly download all the required AP images or instruct some of the APs to download the upgrade image from an remote image server.

Although the above-described discovery mechanism allows a downlink AP to learn the root AP of the micro branch deployment, the downlink AP does not necessarily know which uplink AP is its "exact"/direct parent AP. Accordingly, various embodiments provide enhancements to the conventional IAP hierarchical discovery process or mechanism. In particular, and in addition to the "ROOT IP" field already included in the hierarchical beacon, the "AP_IP" field is added to the hierarchical beacon in addition to the "Root IP" field already included as part of the hierarchical beacon. The branch-key AP received from the cloud can be used between APs for pre-shared key (PSK) authentication as well as Triple Data Encryption Standard (3DES) encryption, thereby providing more security for the topology discovery process.

As a result of the addition of the "AP_IP" field to the hierarchical beacon broadcast by the GAP, the GAP may begin to send its periodic hierarchical beacons, setting both the "ROOT IP" and "AP_IP" fields to match its own management IP address. Referring again to FIG. 3, the enhanced hierarchical discovery process 310 is illustrated. As an example, when AP 210 receives a hierarchical beacon from its uplink port at operation 312, AP 210 becomes aware that a parent AP exists in its micro branch deployment network, and that this parent AP is also the root AP of micro branch deployment network. AP 210 may then respond to the hierarchical beacon at operation 314 by transmitting a hierarchical ACK to GAP 202 through the same uplink port. In this way, GAP 202 learns of the existence of a branch AP in its micro branch deployment network, i.e., downlink AP 210.

At operation 316, AP 210 will modify the original hierarchical beacon received from GAP 202 by changing the "AP_IP" field to reflect its own IP address (rather than the IP address of GAP 202), and may then send the (new) modified hierarchical beacon to all its downlink wired ports. Upon AP 220 receiving this modified hierarchical beacon from its uplink port, AP 220 learns that GAP 202 is the root AP of the micro branch deployment network, while AP 210 is the parent AP of AP 220. At operation 318, AP 220 may then send its own hierarchical ACK to GAP 202 via the uplink port through which it received the modified hierarchical beacon from AP 210. Because of the daisy chain topology, the hierarchical ACK transmitted by AP 220 goes to AP 210 en route to GAP 202. At this point, AP 210 will learn it has a child AP, i.e., AP 220. AP 210 may then relay the hierarchical ACK from AP 220 up to GAP 202. At this point, GAP 202 will learn of the existence of another branch AP, AP 220, that is connected to its downlink wired ports.

It should be understood that the above process/method can repeat depending on how many APs in a micro branch deployment receive a hierarchical beacon from the root AP/GAP, and how many APs respond with their respective hierarchical ACKs. Because hierarchical beacons are sent periodically, e.g., every second, micro branch topology may be continuously discovered/determined and updated. It should be noted that hierarchical beacons should only be considered when received from/via an AP's uplink port. Accordingly, any beacon received from/via an AP's downlink port will be dropped/ignored. Similarly, a hierarchical ACK should only be considered when received from an AP's downlink port, and any hierarchical ACK message received from/via an AP's uplink port will be dropped/ignored. If this scheme is not followed, an AP will not be able to distinguish between uplink/parent APs or the GAP, and downlink/child APs.

As also noted above, a second step in achieving the goal of applying ACL rules only to the AP to which a client device is directly connected/associated without redundant authentication/user rule derivation, involves building an authentication proxy chain using the micro branch deployment topology. In this way, when a client device connects to a micro branch deployment network, this authentication proxy chain can be automatically triggered from a leaf AP to a gateway AP (GAP).

Figure 4:
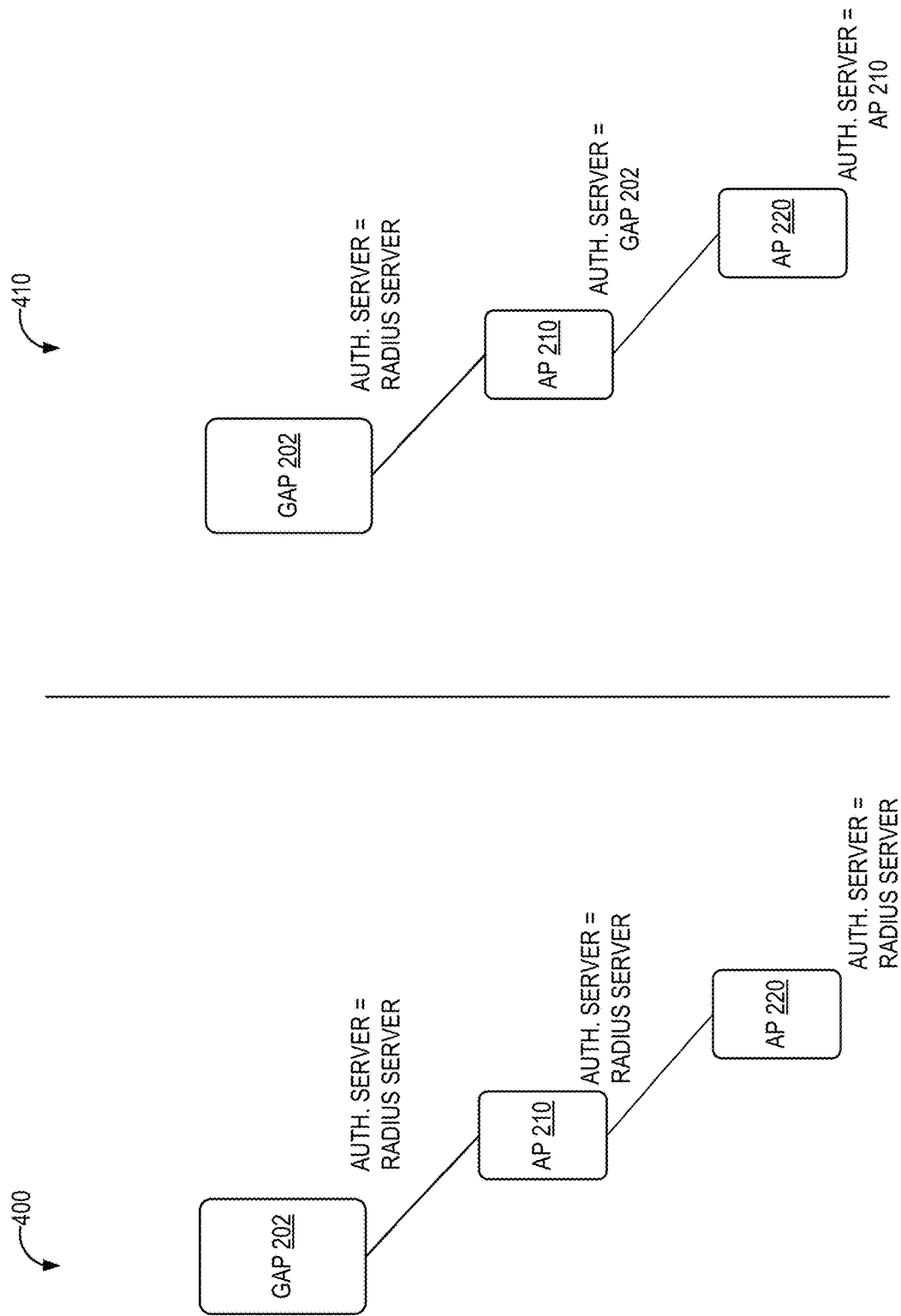
FIG. 4 illustrates an example of automatic authentication proxy chaining in accordance with one embodiment as compared to conventional authentication.

As alluded to above, and as illustrated in FIG. 4, a conventional authentication method 400 for client devices in a micro branch deployment where APs are daisy chained, involves authentication requests that go to the same authentication server from each AP traversed by client device packet/traffic. For example, upon receipt of packet from a client device (not shown in FIG. 4) associated to AP 220, authentication is triggered by requesting authentication from a remote authentication server, e.g., Radius authentication from a remote Radius server. As that packet traverses AP 210, authentication is again triggered using the remote Radius server, and so, up through GAP 202. However, this results in redundant authentication operations being triggered.

Instead, and in accordance with one embodiment, conventional authentication can be replaced with automatic authentication proxy chaining reflected by method 410. As illustrated in FIG. 4, an authentication client in an AP, e.g., Radius client, is configured or set up to initiate access request messages, e.g., Radius access requests, for any client devices associated to an AP and exchange authentication messages/packets with a corresponding authentication server, e.g., Radius server. In a departure from conventional authentication, the authentication server to which Radius access requests are directed to that AP's parent AP. For example, AP 220 sets its authentication server to be its parent AP (which AP 220 discovered/learned by way of the micro branch deployment topology discovery mechanism discussed above). In turn, AP 210 sets its authentication server to be its parent AP, which in this example is the root AP/GAP 202 (again discovered by way of the aforementioned topology discovery mechanism). At GAP 202, the authentication server is to an actual Radius server to which the Radius access requests are ultimately processed. It should be understood that at GAP 202, the network administrator will set the "real" authentication server, as GAP 202 has no uplink/parent AP. In other words, parent APs act as proxy authentication servers (proxy chain) through which authentication access requests are relayed until an actual authentication server is reached.

For example, by virtue of the micro branch topology discovery process, AP 220 may be determined to be a child of AP 210, its parent AP. AP 210 may internally set or specify certain information whereby AP 220 is added or input into an authentication/Radius accept list so that it is able to accept any authentication/Radius access request from AP 220. AP 210 may further set or specify GAP 202 to be the authentication/Radius server so that when AP 210 receives an authentication/Radius access request from AP 220, the request can be proxied to GAP 202. In the reverse direction, when GAP 202 receives an authentication/Radius access response referring to the same client device MAC address, GAP 202 knows that the authentication/Radius access response is relevant to the authentication/Radius client (in this case, AP 210). Thus, GAP 202 may send/forward the authentication/Radius access response to AP 210. AP 210 operates in kind by sending/forwarding the authentication/Radius access response to its authentication/Radius client, AP 220.

Figure 5:
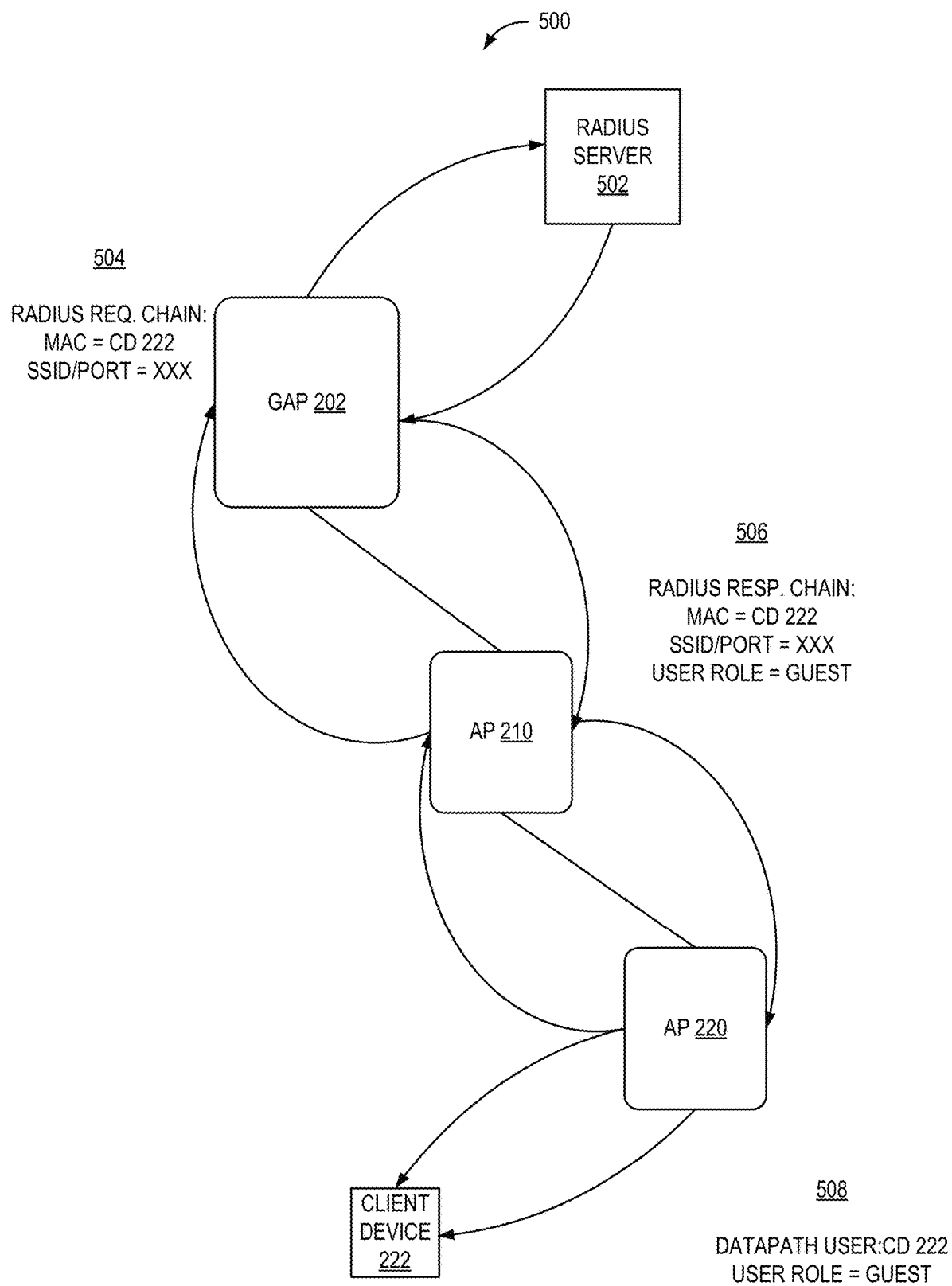
FIG. 5 illustrates an example of firewall optimization in accordance with one embodiment.

As noted above, a third step to achieving firewall policy consistency involves firewall optimization, where only the AP to which a client device is directed connected/associated enforces privileges/rules corresponding to the user role assigned to a client device. Referring now to FIG. 5, which illustrates a firewall optimization method 500, a client device 222 may attempt to connect to an AP, e.g., AP 220, from either a WLAN SSID or wired port. For example's sake, consider that client device 222 attempts to connect to AP 220 via WLAN SSID. AP 220, acting as an authentication client, e.g., Radius client, constructs an access request message, e.g., a Radius Access Request which AP 220 sends to its parent AP, in this case, AP 210. Again, discovery of the micro branch deployment tree topology results in each AP in the micro branch deployment learning/discovering its parent/child APs (if any). An access request message, e.g., Radius Access Request, may include the following information: User-Name <=> username; Calling-Station-Id <=> Client device MAC address; Network-Profile <=> SSID profile name or wired port profile name; NAS-Port-Type <=> to obtain wired/wireless type information. It should be understood that the Network-Profile refers to a new vendor-specific attribute (VSA) which contains the SSID name or wired port profile name. This information helps a GAP, e.g., GAP 202, to find the correct authentication server, e.g., Radius server, for the SSID to which the client device 222 is attempting to connect. When AP 210 (acting as a Radius proxy) receives this Radius Access Request, AP 210 sends the access request to GAP 202. The result is an authentication (e.g., Radius) request chain 504. GAP 202 decodes the Radius Access Request, learns the "SSID profile name," included in the request message, and then uses this name to determine the correct Radius server (configured by a network administrator) to which the access request message should be forwarded.

If there is an authentication server configured, GAP 202 will send the access request message to that authentication server. GAP 202 will expect to receive an access acceptance or rejection response, e.g., Radius Access Accept or Radius Access Reject response. After GAP 202 receives the expected authentication response, GAP 202 sends the authentication response to AP 210. It should be noted that if the authentication server is temporarily unreachable or GAP 202 cannot find an authentication server for that particular access request message—GAP 202 will use a fallback mode by directly sending a an authentication access accept response to AP 210. GAP 202 can also setup a trust user entry (with client device 222's MAC address) to datapath. This can ensure that further data packets coming from client device 222 won't trigger an authentication process on GAP 202. Moreover, GAP 202 won't apply the derived user role to GAP 202's datpath so that those data packets from client device 222 won't be firewalled by GAP 202.

Otherwise, when the same response arrives at AP 210, AP 210 will follow suit. That is, AP 210 may send the authentication access accept response to AP 220, as well as setup a trust user entry to AP 210's datapath. This trust user entry (with client device 222's MAC address) again, ensures no further authentication is required for client device 222. Likewise, AP 210 won't apply the derived user role to its datapath so that client device 222 won't be firewalled by AP 210.

When AP 220 receives the authentication access response, AP 220 consumes the response message as it is the authentication client for client device 222. The result is an authentication response chain 506. AP 220 may thereby end the authentication chaining process, and setup a normal/untrusted datapath user entry that can be applied with a derived user role based on the authentication (Radius) VSA at operation 508. In the case of the fallback mode being used, since GAP 202 won't send any VSA for role derivation, AP 220 may simply apply the default post-authentication user role for that SSID/Wired port. It should be understood that in an authentication/Radius response, a field is used to indicate which user role an AP should apply to a particular client device/user. For example, a network administrator may use a string, such as "guest" specified at the actual authentication server. Thus, when AP 220 receives the authentication access response, it decodes the payload and is aware of the desire to apply the "guest" user role to a particular client device. AP 220 may search its local configuration to determine what has been configured for the guest user role. In most instances, the configuration will already have a user role in place, but if no user role has been configured, a default user role can be used for the particular SSID/wired port.

It should be noted that if the SSID/wired port of an AP is configured as OPEN or PSK, MAC authentication can be automatically enabled for that SSID/wired port. This will trigger the same authentication same chaining process. However, since GAP 202 is not able to find a valid authentication server based on the "Network-Profile" information, it will use the aforementioned fallback mode to send the authentication response to the downlink APs, e.g., APs 210 and 220. It should be noted that embodiments described herein reference Radius authentication. Radius authentication is only one possible authentication mechanism/system that may be used. Other embodiments contemplate the use of other authentication mechanisms, other than Radius, e.g. LDAP, TACACS+, XTACACS, etc.

Figure 6A:
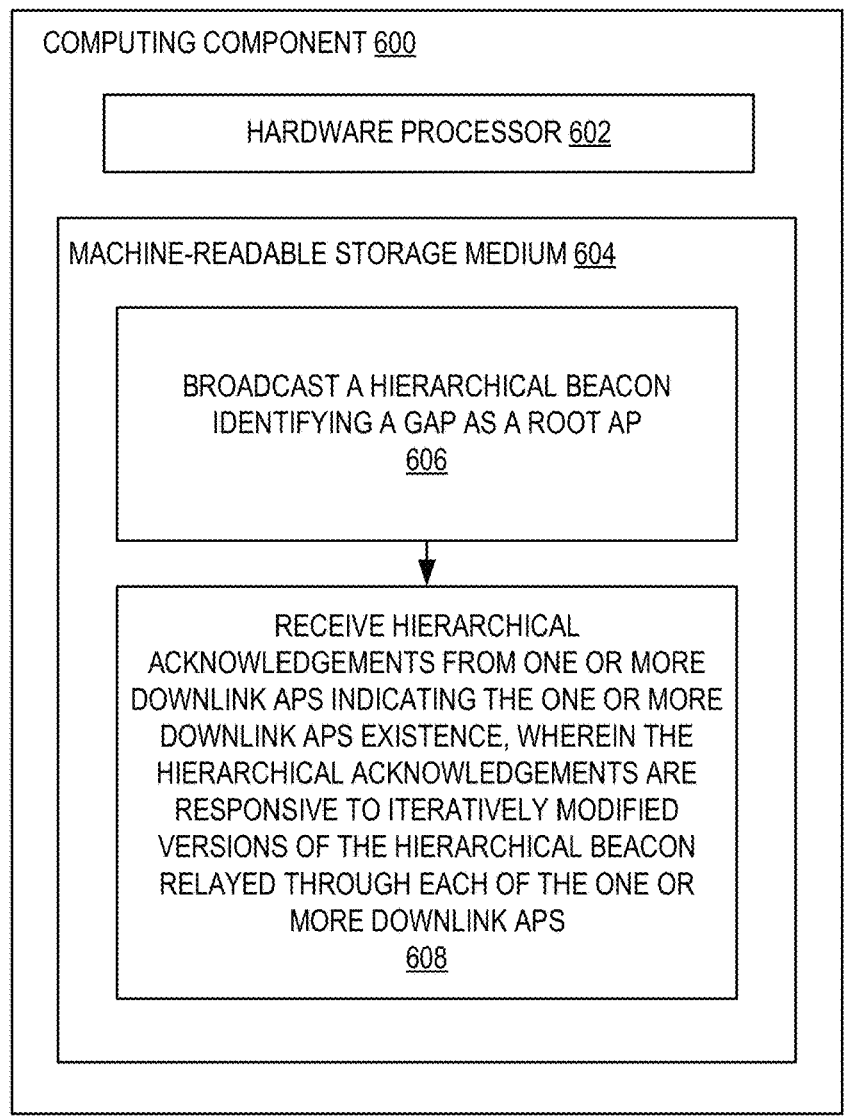
FIGS. 6A-6B are block diagrams of example computing components or devices for micro branch topology discovery in accordance with one embodiment.

FIG. 6A is a block diagram of an example computing component or device 600 for performing micro branch topology discovery in accordance with one embodiment. Computing component 600 may be, for example, a controller, processor, or any other similar computing component capable of processing data, and realizing the functionality of a GAP. In the example implementation of FIG. 6A, computing component 600 includes a hardware processor 602, and machine-readable storage medium 604.

Hardware processor 602 may be one or more central processing units (CPUs), semiconductor-based microprocessors, and/or other hardware devices suitable for retrieval and execution of instructions stored in machine-readable storage medium, 404. Hardware processor 602 may fetch, decode, and execute instructions, such as instructions 606-610, to control processes or operations for establishing connections, synchronizing, and publishing routes/states. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 604 may be encoded with executable instructions, for example, instructions 606-608.

Hardware processor 602 may execute instruction 606 to broadcast a hierarchical beacon identifying a GAP as a root AP. It should be understood that computing component 600 in some embodiments may be a GAP in a micro branch deployment. As noted above, as the GAP of a micro branch deployment, the hierarchical beaconing process may be adapted by adding an AP_IP identifier/indicator to the hierarchical beacon in addition to the root_IP identifier/indicator. That is, both the AP_IP and root_IP identifiers/indicators are set to reflect the GAP's management IP address.

A downlink AP receiving the hierarchical beacon becomes aware of the existence of a parent AP, in this case, the GAP, which is also the root AP of the micro branch deployment. This downlink AP may respond to the hierarchical beacon with a hierarchical acknowledgement. In this way, the GAP learns of the existence of a child or downlink branch AP. This downlink branch AP may then modify the originally received hierarchical beacon by changing the AP_IP identifier/indicator to reflect the downlink branch AP's own IP address, and sends this modified hierarchical beacon to its downlink wired ports to be broadcast to other downlink APs in the micro branch deployment. That is, hardware processor 602 may execute instruction 608 to receive hierarchical acknowledgements from one or more downlink APs indicating existence of the one or more downlink APs, wherein the hierarchical acknowledgements are responsive to iteratively modified versions of the hierarchical beacon relayed through each of the one or more downlink APs. Although some embodiments are described in the context of multiple downlink APs, client devices may connect/associate to a single downlink AP, and may be firewalled by the GAP (e.g., Ethernet downlink port). Accordingly, embodiments described herein may be applicable to a topology including a single downlink AP as well.

It should be understood that the GAP broadcasts the hierarchical beacon on its downlink wired ports as well, and any downlink branch APs receive the original or modified hierarchical beacon(s) on their respective uplink wired ports. This process can continue until the micro branch topology is discovered from the perspective of the GAP and any APs in the micro branch deployment.

Figure 6B:
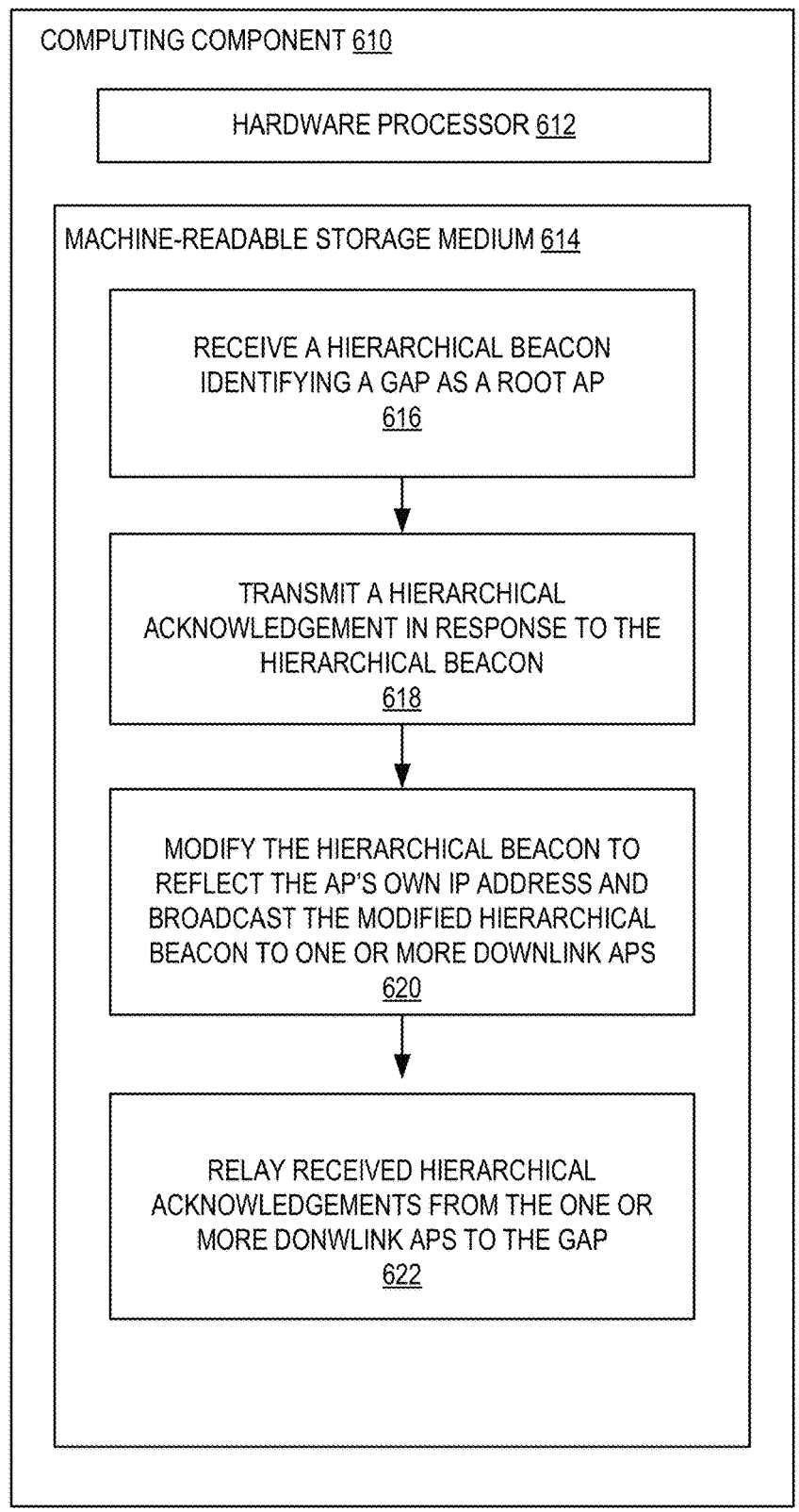

FIG. 6B is a block diagram of an example computing component or device 610 for performing micro branch AP topology discovery in accordance with one embodiment. Computing component 610 may be, for example, a controller, processor, or any other similar computing component capable of processing data, and realizing the functionality of an AP. That is, FIG. 6B illustrates micro branch AP topology discovery from the perspective of a downlink AP. In the example implementation of FIG. 6B, computing component 610 includes a hardware processor 612, and machine-readable storage medium 614, which may be further embodiments of, e.g., hardware processor 602 and machine-readable storage medium 604.

Hardware processor 612 may execute instruction 616 to receive a hierarchical beacon identifying a GAP as a root AP to the AP. As described above, the hierarchical beacon not only includes a root_IP identifier, but also includes an AP-IP identifier, where the GAP is reflected in both the root_IP and AP_IP identifiers.

Hardware processor 612 may execute instruction 618 to transmit a hierarchical acknowledgement in response to the hierarchical beacon, e.g., back to the GAP or its immediate parent AP. Hardware processor 612 may execute instruction 620 to modify the hierarchical beacon to reflect the AP's own IP address and broadcast the modified hierarchical beacon to one or more downlink APs. Hardware processor 612 may execute instruction 622 to relay received hierarchical acknowledgements from the one or more downlink APs to the GAP. In this way, the hierarchical beacon is iteratively modified as it progresses through each downlink AP, and each downlink AP becomes aware of the GAP (identified via the root_IP identifier) and its respective parent AP (identified via the iteratively modified hierarchical beacon, the modification arising vis-à-vis the changing AP_IP identifier during progression through each of the APs in the micro branch deployment. Each hierarchical acknowledgement received at the GAP also informs the GAP of each of its downlink branch APs.

Figure 6C:
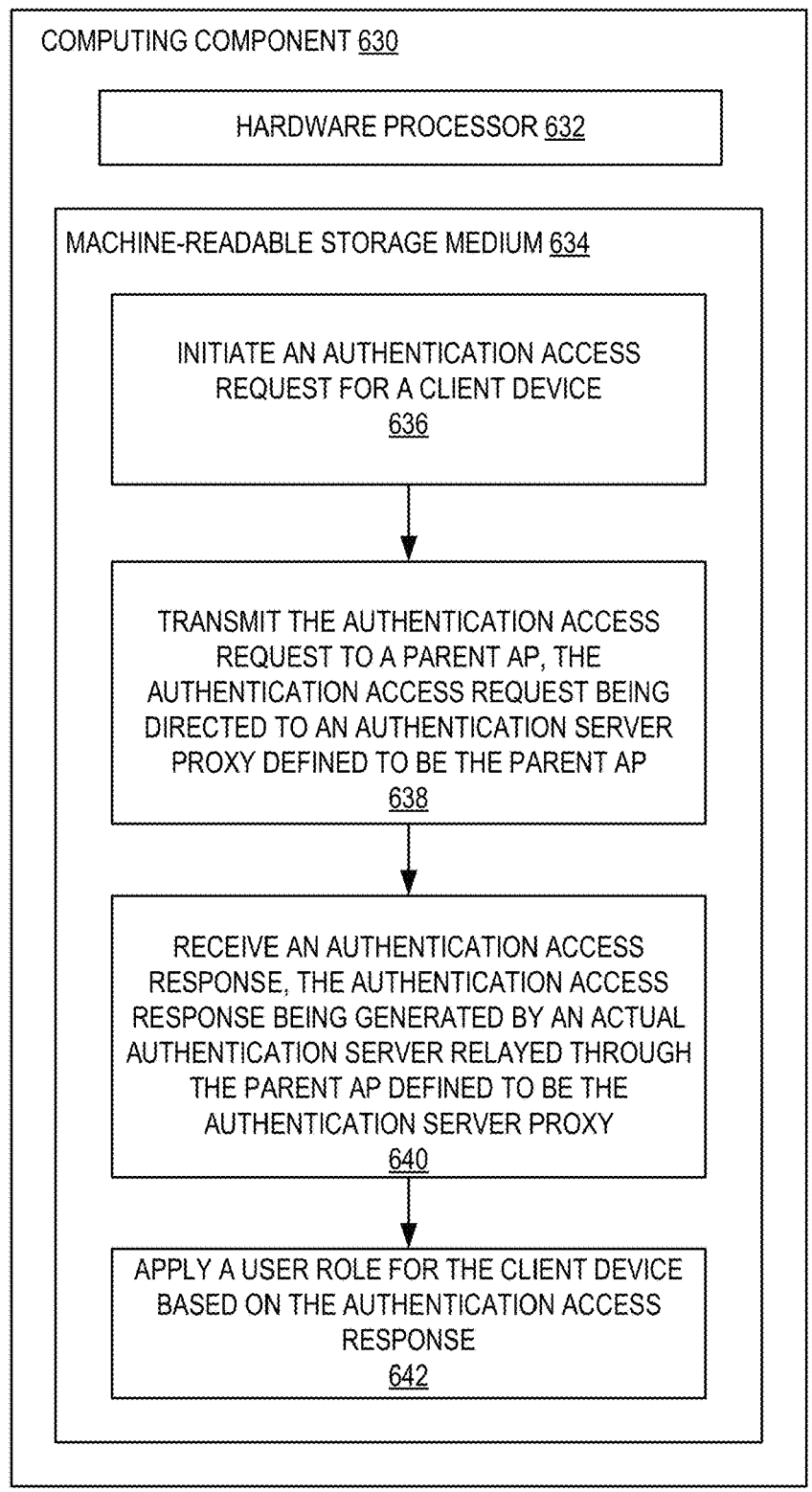
FIG. 6C is a block diagram of an example computing component or device for firewall optimization in accordance with one embodiment.

FIG. 6C is a block diagram of an example computing component or device 630 for performing firewall optimization in accordance with one embodiment. Computing component 630 may be, for example, a controller, processor, or any other similar computing component capable of processing data, and realizing the functionality of an AP. In the example implementation of FIG. 6C, computing component 630 includes a hardware processor 632, and machine-readable storage medium 634, which may be further embodiments of, e.g., hardware processor 602 and machine-readable storage medium 604.

Hardware processor 632 may execute instruction 636 to initiate an authentication access request for a client device. It should be understood that computing component may be a downlink AP of a micro branch deployment to which the client device is associated. As noted above, an authentication proxy chain may be established, where each downlink AP in the micro branch deployment is directed to an authentication server (for receiving an authentication access request) defined to be a parent AP to the AP generating/transmitting the authentication access request. In other words, each AP that is a parent to a child AP acts an authentication proxy until the parent in the chain of authentication proxies is the GAP. The GAP may then point to an actual authentication server to perform client device authentication. Accordingly, hardware processor 632 may execute instruction 638 to transmit the authentication access request to a parent AP, the authentication access request being directed to an authentication server proxy defined to be the parent AP.

Hardware processor 632 may execute instruction 640 to receive an authentication access response, the authentication access response being generated by an actual authentication server relayed through the parent AP defined to be the authentication server proxy. That is, upon processing the authentication access request at the actual authentication server (proxied vis-à-vis the APs in the micro branch deployment), an authentication access response can be similarly relayed back down through the APs until it reaches the AP that transmitted the authentication access request. As described above with respect to FIG. 5, the GAP of the micro branch deployment may set up a TRUST user entry to prohibit firewalling of data packets received from the client device at any AP except for the AP to which the client device is associated, thereby avoiding redundant application of firewall policies.

As noted above, various embodiments leverage the existing IAP hierarchical beacon mechanism in an enhanced manner (i.e., through inclusion of an AP_IP identifier in the hierarchical beacon broadcast by a GAP), so that the GAP/AP topology of a micro branch deployment may be determined. The determined topology allows the automatic building of an authentication proxy chain across the micro branch deployment. When client devices connect to any of the APs in the micro branch deployment, those client devices will undergo authentication in accordance with the authentication proxy chain. In this way, authentication is only triggered on the AP to which the client is connected, thereby avoiding redundant authentication transactions. The firewall is only executed on the AP where the client is connecting to, avoiding the aforementioned multiple firewall issue, and improving flow processing time. Additionally, using, e.g., Radius authentication, a single user role can be derived and applied to the connected AP, negating the need for a network administrator to coordinate their firewall policy across multiple devices, thus simplifying the management effort. Accordingly, hardware processor may execute instruction 642 to apply a user role for the client device based on the authentication access response.

Figure 7:
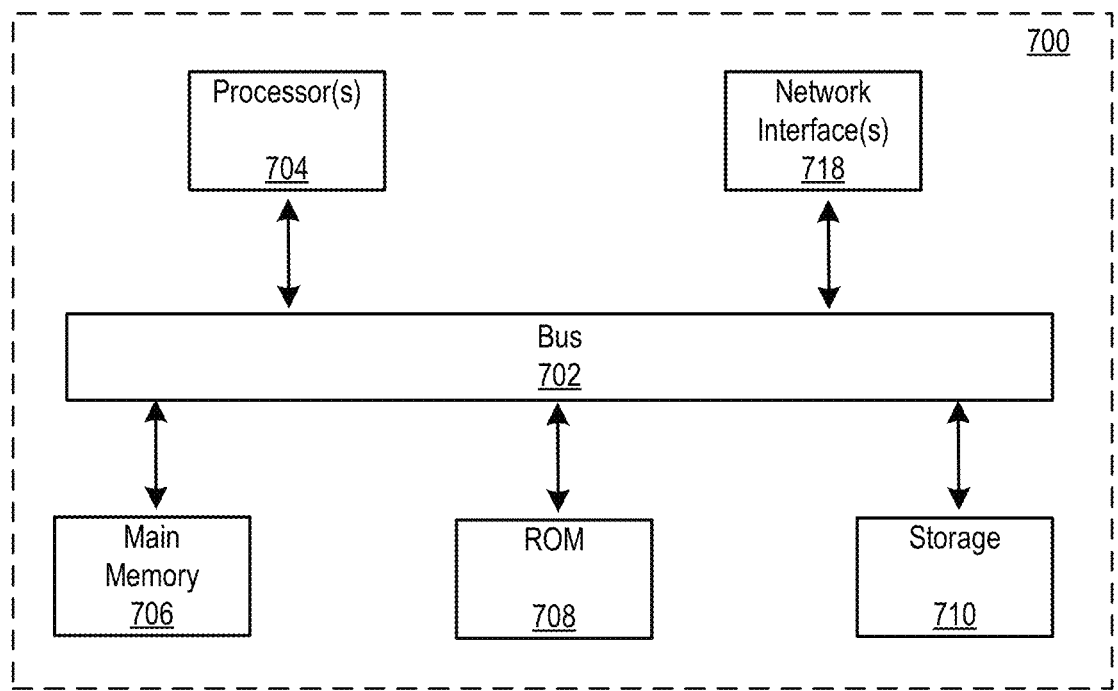
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes memory units, such as a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   broadcasting, from a gateway access point (GAP), a hierarchical beacon identifying the GAP as a root access point (AP) of a micro branch deployment network;
   receiving, at the GAP, hierarchical beacon acknowledgements from one or more downlink APs indicating existence of the one or more downlink APs in the micro branch deployment network, wherein the hierarchical acknowledgements are responsive to iteratively modified versions of the hierarchical beacon relayed through each of the one or more downlink APs; and
   discovering a topology of the micro branch deployment network based on the received hierarchical beacon acknowledgements.

2. The method of claim 1, wherein the one or more downlink APs are implemented as chained APs operatively connected in series via respective wired ports of the one or more downlink APs.

3. The method of claim 2, wherein the broadcasting of the hierarchical beacon and relaying of the iteratively modified versions of the hierarchical beacon occurs over a wired downlink port of the GAP and respective downlink ports of the one or more downlink APs, and wherein receipt of the hierarchical beacon and the iteratively modified versions of the hierarchical beacons occurs over respective uplink ports of the one or more downlink APs.

4. The method of claim 1, wherein the hierarchical beacon comprises a Layer 2 broadcast data packet including a root Internet Protocol (ROOT_IP) field and an AP_IP field, each of which reflect the GAP's management IP address prior to iterative modification thereof.

5. The method of claim 4, wherein the iteratively modified versions of the hierarchical beacon comprise a modified AP_IP field reflecting an IP address of a receiving downlink AP of the plurality of downlink APs.

6. A method, comprising:
receiving, at a downlink access point (AP) of a micro branch deployment network, a hierarchical beacon identifying a gateway AP (GAP) as a root AP of the micro branch deployment network;
transmitting, from the downlink AP, a hierarchical acknowledgement in response to the received hierarchical beacon;
modifying, at the downlink AP, the hierarchical beacon to reflect the downlink AP's own IP address and broadcasting the modified hierarchical beacon to one or more additional downlink APs of the micro branch deployment network;
relaying, from the downlink AP, received hierarchical acknowledgements from the one or more additional downlink APs to the GAP; and
discovering, by the downlink AP, a topology of the micro branch deployment network based on the received hierarchical beacon and the received hierarchical acknowledgements.

7. The method of claim 6, wherein the downlink AP and the one or more additional downlink APs are implemented as chained APs operatively connected in series via respective wired ports thereof.

8. The method of claim 7, wherein the broadcasting of the modified hierarchical beacon occurs over a wired downlink port of the downlink AP, the relaying of the received hierarchical acknowledgements occurs over a wired uplink port of the downlink AP, and wherein receipt of the hierarchical beacon from the GAP occurs over a wired uplink port of the downlink AP.

9. The method of claim 6, wherein the hierarchical beacon comprises a Layer 2 broadcast data packet including a root Internet Protocol (ROOT_IP) field and an AP_IP field, each of which reflect the GAP's management IP address.

10. The method of claim 9, wherein the modified hierarchical beacon comprises a modified AP_IP field reflecting an IP address of the downlink AP.

11. A method, comprising:
initiating, by a downlink access point (AP) of a micro branch deployment network, an authentication access request for a client device associated to the downlink AP;
transmitting, from the downlink AP, the authentication access request to a parent AP, the authentication access request being directed to an authentication server proxy defined to be the parent AP;
receiving, at the downlink AP, an authentication access response, the authentication access response being generated by an actual authentication server relayed through the parent AP defined to be the authentication server proxy;
applying a user role for the client device based on the authentication access response,
wherein the user role is derived from a payload of the authentication access response, and application of the user role occurs only at the downlink AP to which the client device is associated; and
establishing, at a gateway AP of the micro branch deployment network operatively implemented as root AP of the micro branch deployment network, a trusted user entry with the associated client device's media access control (MAC) address such that additional data packets received from the associated client device do not trigger authentication at the GAP.

12. The method of claim 11, further comprising establishing, at the parent AP, a trusted user entry with the associated client device's media access control (MAC) address such that additional data packets received from the associated client device do not trigger authentication at the parent AP.

13. The method of claim 12, wherein the application of the user role only at the downlink AP comprises establishing, at the downlink AP, an untrusted datapath user entry.

14. The method of claim 13, wherein the application of the user role only at the downlink AP further comprises applying the untrusted datapath user with a derived user role.

15. The method of claim 14, wherein the authentication access request comprises one of a service set identifier (SSID) or a wired port profile name of the downlink AP identifying the actual authentication server serving the associated client device.

16. The method of claim 14, wherein the derived user role is based on the one of the SSID or wired port profile name.

17. The method of claim 11, further comprising, prior to the initiation of the authentication access request for the associated client device, determining a topology of the micro branch deployment network to discover which of a plurality of APs in the micro branch deployment network comprises the GAP.

18. The method of claim 17, further comprising, prior to the initiation of the authentication access request for the associated client device, determining the topology of the micro branch deployment network to discover which of the plurality of APs in the micro branch deployment network comprises the parent AP of the downlink AP.

* * * * *